Figures 1, 2:
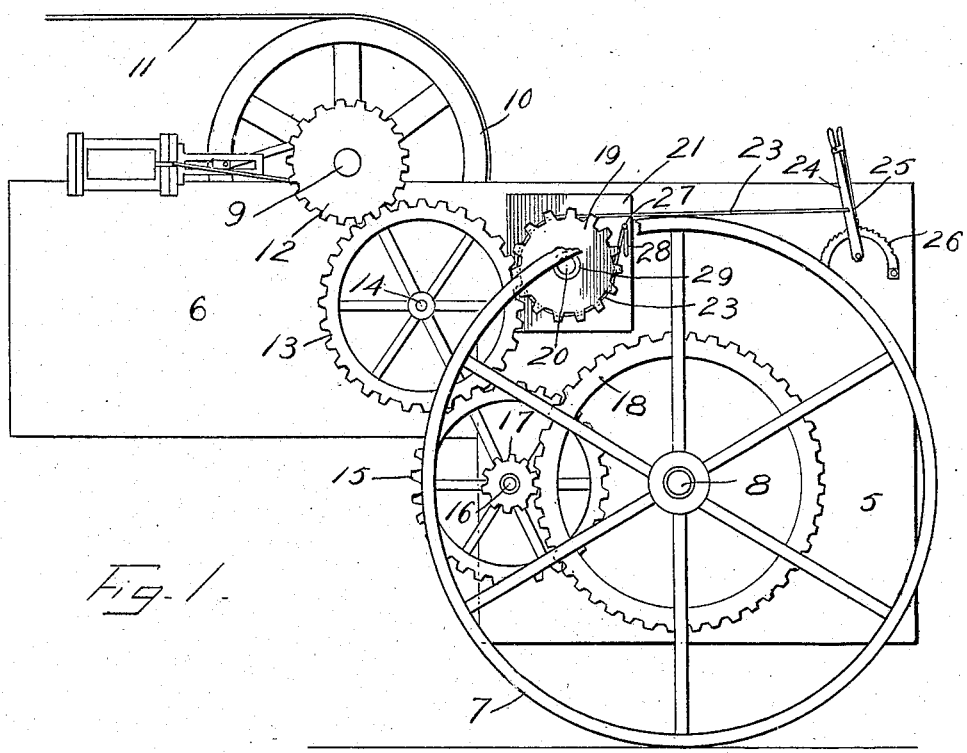

J. & W. MINNAUGH.
BRAKE MECHANISM FOR TRACTION ENGINES.
APPLICATION FILED NOV. 16, 1907.

911,148.

Patented Feb. 2, 1909.

Witnesses
J. C. Simpson
H. C. McCluney

Inventors
John Minnaugh.
William Minnaugh.

By Chandler & Chandler
Attorneys

UNITED STATES PATENT OFFICE.

JOHN MINNAUGH AND WILLIAM MINNAUGH, OF VALLEY CITY, NORTH DAKOTA.

BRAKE MECHANISM FOR TRACTION-ENGINES.

No. 911,148.　　　　　Specification of Letters Patent.　　　　Patented Feb. 2, 1909.

Application filed November 16, 1907. Serial No. 402,524.

*To all whom it may concern:*

Be it known that we, JOHN MINNAUGH and WILLIAM MINNAUGH, citizens of the United States, residing at Valley City, in the county of Barnes, State of North Dakota, have invented certain new and useful Improvements in Brake Mechanism for Traction-Engines; and we do hereby declare the following to be a full, clear, and exact description of the invention, such as will enable others skilled in the art to which it appertains to make and use the same.

The present invention has reference to brakes, and it aims, generally, to provide an exceedingly simple, and efficient mechanism of that nature designed especially for attachment to a traction engine, to prevent any forward movement thereof when operatively connected with a thresher or other machine, thus rendering the use of a stop block or jack unnecessary.

To this end, the mechanism comprises, briefly, a drum formed upon a gear disposed in mesh with one member of the train of gears which connect the gears on the engine shaft and drive axle, a strap passed around the drum, and an operating lever connected to one end of the strap, it being possible, therefore, for the engineer to tighten the strap against the drum by a single movement of the lever, thus braking the engine and positively holding the same against forward movement.

The invention will be readily understood from a consideration of the following detailed description, and its preferred embodiment is illustrated in the accompanying drawings in which like parts or features, as the case may be, are designated by corresponding reference numerals in the several views.

Of the said drawings:—Figure 1 is a fragmental side elevation of a traction engine with the improved brake applied thereto, and Fig. 2 is an enlarged end view of the combined drum and gear and the pin to which the adjacent end of the brake strap is fastened.

Referring more particularly to the drawings, 5 designates, generally, the traction engine, 6 the boiler thereof, 7 the traction wheels carried by the rear or drive axle 8, and 9 the engine shaft.

The last-mentioned element is provided at one end with a belt pulley 10 connected by a belt 11 with the threshing machine not shown, and at the other end with a gear 12 which meshes with a larger gear 13 loosely mounted upon a horizontal stub shaft or pin 14 secured to the boiler of the engine. The gear 13 meshes in turn with a gear 15 mounted upon a second stub shaft 16, the gear 15 having rigidly secured thereto a smaller gear 17 which meshes with the gear 18 on the axle 8. The gear 13 also meshes with a gear 19 which forms one element of the brake mechanism and is loosely mounted upon a stub shaft 20 projecting laterally from a plate 21 secured to the boiler. The gear 19 is compounded with a drum 22 as shown in Fig. 2. Over and around this drum is passed the brake-strap 23 whose upper stretch extends rearwardly and is attached at its end to a lever 24 pivoted to a segmental rack 26 which is likewise secured to the side of the boiler adjacent the rear end thereof so as to be within easy reach of the engineer, the lever being provided with a spring-pressed detent 25 for engagement with the rack teeth. The opposite end of the brake-strap is directed upwardly to a point some distance above the horizontal diameter of the drum, and is made fast to a laterally-projecting pin 27 set into the plate 21 and strengthened by a diagonal brace 28 secured at opposite ends thereto and to the plate.

The drum and its gear are retained in place upon the stub-shaft 20 by means of a cap or collar 29 which is bolted or otherwise secured to the outer end of the shaft, as shown.

It will be apparent from the foregoing that in order to brake the engine it is only necessary for the engineer to swing the lever 24 toward him, whereupon the brake-strap will be tightened against the drum and rotation thereof and of the gears 19 and 18 thus prevented, the lever being held against reverse movement by the engagement of its detent with the rack. Any tendency towards forward movement on the part of the engine will thus be prevented, so that the use of a wooden stop-block, or jack is thus rendered unnecessary.

As originally stated the brake mechanism is designed primarily for use during the period that the engine shaft is operatively connected with the threshing machine, or, in other words, when the traction engine, as a whole, is stationary, at which time the gear 12, which is keyed to the engine shaft, is moved out of mesh with the gear 13. It will be understood, however, that such mechanism may be used in slowing the engine when traveling on a down-grade.

What is claimed is:—

In a brake mechanism for traction engines, in combination, a plate secured to the engine; a laterally-projecting stub shaft carried by said plate; a gear loosely mounted upon said shaft; a drum compounded with said gear; a gear meshing with the first-mentioned gear; a laterally-projecting pin carried by said plate; a flexible brake-band passed around said drum and secured at one end to said pin; a rack secured to the engine; an operating lever pivoted to said rack and secured to the other end of the brake-band for tightening the latter against said drum, to brake the same and hold the last-mentioned gear against rotation; and a detent carried by the lever for engagement with said rack.

In testimony whereof, we affix our signatures, in presence of two witnesses.

JOHN MINNAUGH.
WILLIAM MINNAUGH.

Witnesses:
J. E. MORIARITY,
C. G. SMITH.